United States Patent Office 3,423,422
Patented Jan. 21, 1969

3,423,422
2-(ARYL)-2-IMIDAZOLINES
Halbert C. White, Midland, Mich., assignor to The Dow Chemical Company, Midland, Mich., a corporation of Delaware
No Drawing. Filed Apr. 4, 1967, Ser. No. 628,298
U.S. Cl. 260—309.6          5 Claims
Int. Cl. C07d 49/34; A61k 27/00

ABSTRACT OF THE DISCLOSURE

The new compounds, 2 - (2,3,6 - trichlorobenzyl) - 2-imidazoline, and their physiologically-acceptable salts such as the hydrochloride. The new compounds are useful as analgesics, sedatives and tranquilizers.

---

This invention is concerned with aryl imidazolines and is particularly directed to 2-(2,3,6-trichlorobenzyl)-2-imidazoline, 1 - methyl-2-(2,3,6-trichlorobenzyl)-2-imidazoline and the physiologically-acceptable salts thereof having the formula:

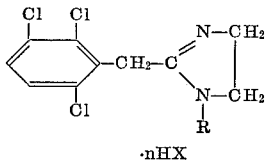

·nHX

In the present specification and claims, R represents methyl or hydrogen, $n$ represents an integer from zero to one and HX represents the anionic moiety of a physiologically-acceptable salt. The term "physiologically-acceptable salt" as herein employed refers to salts of the 2-(2,3,6-trichlorobenzyl)-2-imidazoline compounds which are substantially non-toxic to animals at dosages consistent with good pharmacological activity. Such physiologically-acceptable salts include non-toxic acid addition salts with inorganic acids such as hydrochloric, hydrobromic, sulfuric or phosphoric acid, or with organic acids such as acetic, succinic, malic, maleic, tartaric or citric acid, or with organic sulfonic acids such as methanesulfonic or p-toluenesulfonic acid. The novel imidazoline compounds are crystalline solids which are of varying degrees of solubility in organic solvents such as 1,2-dichlorobenzene, methylene chloride and alcohols and only slightly soluble in water. The physiologically-acceptable salts of the novel compounds are soluble in water and slightly soluble in organic solvents such as acetone, benzene and alcohols.

2-(2,3,6-trichlorobenzyl)-2-imidazoline and 1-methyl-2-(2,3,6-trichlorobenzyl)-2-imidazoline have been found to be useful for administration to laboratory animals in studying the behavior thereof and in studying drug effects on the central and peripheral nervous system. The novel compounds have been found to be useful as tranquilizers and diuretics and to be particularly useful as analgesics. For such uses, the preferred form of 2-(2,3,6-trichlorobenzyl)-2-imidazoline is a physiologically-acceptable salt thereof and 2 - (2,3,6 - trichlorobenzyl) - 2-imidazoline is preferably employed in the form of its hydrochloride salt. Other salts, and particularly the tosylate (p-toluenesulfonate) of 2-(2,3,6-trichlorobenzyl)-2-imidazoline, can be used in the preparation and purification of the compounds.

2-(2,3,6-trichlorobenzyl)-2-imidazoline is prepared by the reaction of 2,3,6-trichlorophenylacetonitrile with ethylenediamine monotosylate to form 2-(2,3,6-trichlorobenzyl)-2-imidazoline tosylate, and the subsequent hydrolysis of the 2 - (2,3,6 - trichlorobenzyl) - 2-imidazoline tosylate in aqueous base to liberate 2-(2,3,6-trichlorobenzyl)-2-imidazoline in the free base form. The reaction proceeds with the evolution of ammonia when the reactants are contacted and mixed, preferably in an inert organic solvent as a reaction medium. Representative and suitable inert organic solvents which can be employed as reaction media include alkylbenzenes, xylenes, halobenzenes and preferably 1,2-dichlorobenzene. The exact proportions of the reactants to be employed are not critical, some of the desired product being obtained when the reactants are combined in any proportions. However, the reaction consumes the reactants in equimolar proportions and the use of the reactants in such proportions is preferred. The reaction is conveniently carried out under an inert atmosphere, preferably with an inert gas being directed through the reaction mixture to carry off ammonia of reaction. The preferred inert gas is nitrogen, and in a convenient procedure, the reaction vessel is vented to a trap containing aqueous hydrochloric acid to react with the ammonia of reaction. The reaction proceeds readily at temperatures from about 150° to about 180° C., and it is preferably carried out under reflux at the boiling temperature of the reaction mixture. The 2-(2,3,6-trichlorobenzyl)-2-imidazoline product precipitates in the reaction mixture as its tosylate (p-toluenesulfonate) salt, and the salt can be separated by such conventional methods as filtration, centrifugation or decantation. The 2-(2,3,6-trichlorobenzyl)-2-imidazoline tosylate can be purified by conventional procedures such as recrystallization and washing. The 2-(2,3,6-trichlorobenzyl)-2-imidazoline tosylate can be converted to the free base form of 2-(2,3,6-trichlorobenzyl)-2-imidazoline by hydrolysis in aqueous base. The free base 2-(2,3,6-trichlorobenzyl)-2-imidazoline is then separated by extraction with an organic solvent such as methylene chloride or chloroform, followed by evaporation of the solvent. The product can be purified by conventional methods such as recrystallization, or it can be converted to a physiologically-acceptable salt.

1-methyl-2-(2,3,6-trichlorobenzyl) - 2 - imidazoline is prepared by the N methylation of 2-(2,3,6-trichlorobenzyl)-2-imidazoline with dimethylsulfate. The reaction proceeds with the evolution of heat when the reactants are contacted and mixed, preferably in water as reaction medium. The exact proportions of the reactants to be employed are not critical, some of the desired product being obtained when the reactants are combined in any proportions. However, the reaction consumes the reactants in substantially equimolar proportions and the use of the reactants in such proportions is preferred. The reaction is carried out at temperatures from about 25° to 75° C. and is generally complete within about three hours. The 1-methyl-2-(2,3,6-trichlorobenzyl)-2-imidazoline product is more soluble in water than the imidazoline starting material. The product can be conveniently separated by cooling the reaction mixture and adding aqueous base such as sodium hydroxide to precipitate unreacted starting material. The product can then be separated by conventional methods such as filtration or decantation, followed by evaporation to remove the aqueous reaction medium. The product can be further purified by recrystallization or it can be converted to a physiologically-acceptable salt.

The physiologically-acceptable salts of the imidazoline compounds can be prepared by dissolving the compound in a minimal amount of alcohol and adding an alcohol solution of an acid such as hydrochloric acid, hydrobromic acid, malic acid, maleic acid or succinc acid until precipitation of the corresponding salt is complete. The salt can be further purified by recrystallization or converted to the free base form.

The free base of the imidazoline compounds can be prepared by hydrolysis of the salt in aqueous base. The salt is mixed with an aqueous solution containing about one molar equivalent of sodium hydroxide, after which the free base can be separated by extraction with a chlorinated hydrocarbon solvent. The solvent can be removed by conventional methods such as evaporation or distillation and the free base can be purified by methods such as recrystallization.

The following examples illustrate the invention but are not to be construed as limiting the same.

Example 1

2,3,6 - trichlorophenylacetonitrile (66 grams; 0.30 mole) was mixed with ethylenediamine monotosylate (70 grams; 0.30 mole) and 150 milliliters of 1,2-dichlorobenzene. Nitrogen gas was directed through the mixture while the mixture was heated at the boiling temperature under reflux for three hours, during which time a precipitate formed. The ammonia of reaction was collected by passing the exit gases through a gas scrubber containing dilute aqueous hydrochloric acid. The reaction mixture was cooled and mixed with 150 milliliters of benzene and filtered. 2-(2,3,6-trichlorobenzyl)-2-imidazoline tosylate, having a molecular weight of 435.8, was obtained as a filter cake. The filter cake residue was dissolved in 500 milliliters of water and the solution made basic by the addition of 50 milliliters of aqueous 5 normal sodium hydroxide. The mixture was filtered and 2-(2,3,6-trichlorobenzyl)-2-imidazoline, having a molecular weight of 263.6, was collected as a filter cake. The 2-(2,3,6-trichlorobenzyl)-2-imidazoline product was found to melt at 197°–202° C.

Example 2

The 2-(2,3,6-trichlorobenzyl)-2-imidazoline of Example 1 was dissolved in 400 milliliters of isopropanol. 64 milliliters of 5 normal hydrochloric acid in isopropanol solution were added. The mixture was filtered and the 2-(2,3,6-trichlorobenzyl)-2-imidazoline hydrochloride product was collected as a filter cake and found to melt at 246°–247° C. The structure of the product was confirmed by nuclear magnetic resonance spectroscopy.

In substantially the same procedure described above, employing similar inert organic solvents and substituting for the hydrochloric acid an acid capable of forming a physiologically-acceptable salt, the following 2-(2,3,6-trichlorobenzyl)-2-imidazoline salts are prepared.

2-(2,3,6-trichlorobenzyl)-2-imidazoline hydrobromide, having a molecular weight of 344.5, is prepared by substituting hydrogen bromide in lieu of the hydrogen chloride in the procedure described above.

2-(2,3,6-trichlorobenzyl)-2-imidazoline sulfate, having a molecular weight of 361.7, is prepared by substituting sulfuric acid in lieu of the hydrochloric acid in the procedure described above.

2-(2,3,6-trichlorobenzyl)-2-imidazoline succinate, having a molecular weight of 381.7, is prepared by substituting succine acid in lieu of the hydrochloric acid in the procedure described above.

2-(2,3,6-trichlorobenzyl)-2-imidazoline maleate, having a molecular weight of 379.7, is prepared by substituting maleic acid in lieu of the hydrochloric acid in the procedure described above.

2-(2,3,6-trichlorobenzyl)-2-imidazoline malate, having a molecular weight of 397.7, is prepared by substituting malic acid in lieu of the hydrochloric acid in the procedure described above.

Example 3

Dimethylsulfate (6.9 milliliters; 0.072 mole) was added with stirring to 2-(2,3,6-trichlorobenzyl)-2-imidazoline (18.8 grams; 0.072 mole) in 36 milliliters of water. The temperature rose spontaneously to about 40° C. and all the solid materials appeared to go into solution. The mixture was held at a temperature of 50°–55° C. for three hours after which it was cooled. Aqueous 5 normal sodium hydroxide was added until precipitation of the unreacted starting materials was complete. The mixture was filtered and the filtrate was evaporated to yield 1-methyl-2-(2,3,6-trichlorobenzyl)-2-imidazoline as a residue. The product was found to melt at 93°–95° C. and to have a neutral equivalent weight of 278 as compared with a theoretical equivalent weight of 277.5 calculated for the named structure.

In substantially the same procedure described above with respect to Example 2, 1-methyl-2-(2,3,6-trichlorobenzyl)-2-imidazoline hydrochloride, having a molecular weight of 314, is prepared by dissolving 1-methyl-2-(2,3,6-trichlorobenzyl)-2-imidazoline in isopropanol and adding an isopropanol solution of hydrogen chloride to precipitate the hydrochloride salt.

The analgesic activity of the compounds was indicated by the blocking of hydrochloric acid-induced writhing in mice. Separate groups of mice were administered one of 2-(2,3,6-trichlorobenzyl)-2-imidazoline hydrochloride and 1-methyl-2-(2,3,6-trichlorobenzyl)-2-imidazoline at various dosage rates. The mice were subsequently challenged by the intraperitoneal injection of aqueous 0.1 percent hydrochloric acid at a dosage rate of 0.01 milliliter per gram, after which the mice were placed in clear plastic cages and observed. In mice not previously treated with a compound having analgesic activity, the intraperitoneal injection of this dosage of hydrochloric acid is followed by characteristic writhing of the mice, that is, flattening of the abdomen against the floor of the cage accompanied by rotation of the spine and pelvis. The dosages of the two imidazoline compounds which were effective to prevent writhing in 50 percent of the mice (ED 50) was calculated. The ED 50 for the oral administration of 2-(2,3,6-trichlorobenzyl)-2-imidazoline hydrochloride was 44.8 micrograms per kilogram. The ED 50 for subcutaneous injection of 1 - methyl - 2-(2,3,6-trichlorobenzyl)-2-imidazoline was 0.8 milligram per kiolgram.

In other pharmacological tests, 2 - (2,3,6 - trichlorobenzyl)-2-imidazoline hydrochloride was found to protect mice from hyper-excitment, tremors and death induced by the intraperitoneal injection of 20 milligrams per kilogram of amphetamine when administered to the mice at a dosage rate of 2.5 milligrams per kilogram. In similar operations, 1-methyl-2-(2,3,6-trichlorobenzyl)-2-imidazoline was found to protect mice against a similar dose of amphetamine when administered at a dosage rate of 10 milligrams per kilogram. In similar operations carried out for comparison, the known compound, 2-(2,6-dichlorobenzyl)-2-imidazoline hydrochloride, was found to give no significant protection against a similar dose of amphetamine when administered at a dosage rate of 25 milligrams per kilogram.

In other operations, both 2-(2,3,6-trichlorobenzyl)-2-imidazoline hydrochloride and 1 - methyl - 2-(2,3,6-trichlorobenzyl)-2-imidazoline were found to potentiate hexobarbital sleep time in mice.

The 2,3,6-trichlorophenylacetonitrile employed as a starting material herein is prepared according to known procedures. For example, α,2,3,6-tetrachlorotoluene (230 grams; 1.00 mole), 500 milliliters of ethanol and sodium cyanide (54 grams; 1.1 mole) were mixed together and the mixture was heated at 80° C. for five hours. The reaction mixture was diluted with water and then extracted with methylene chloride. The extract was distilled and the product collected as a fraction boiling at 124°–126° C. under a pressure of 3 millimeters of mercury. The product was recrystallized from cyclohexane and found to melt at 66°–67° C.

I claim:

1. A member of the group consisting of 2-(2,3,6-trichlorobenzyl) - 2-imidazoline and 1-methyl-2-(2,3,6-trichlorobenzyl)-2-imidazoline, and the physiologically-acceptable salts thereof.

2. The compound of claim 1 wherein the compound is 2-(2,3,6-trichlorobenzyl)-2-imidazoline.

3. The compound of claim 1 wherein the compound is 2-(2,3,6-trichlorobenzyl)-2-imidazoline hydrochloride.

4. The compound of claim 1 wherein the compound is 2-(2,3,6-trichlorobenzyl)-2-imidazoline tosylate.

5. The compound of claim 1 wherein the compound is 1-methyl-2-(2,3,6-trichlorobenzyl)-2-imidazoline.

References Cited

UNITED STATES PATENTS 2,919,274   12/1959   Faust et al. _____ 260—309.6

HENRY R. JILES, *Primary Examiner.*

NATALIE TROUSOF, *Assistant Examiner.*

U.S. Cl. X.R.

260—465; 424—254, 273